US012803487B2

United States Patent
(12) United States Patent
Jiang et al.

(10) Patent No.: US 12,803,487 B2
(45) Date of Patent: Nov. 17, 2026

(54) SWITCH SHORT-CIRCUIT FAULT-TOLERANT CONTROL METHOD AND SYSTEM FOR MAGNETIC LEVITATION BEARING

(71) Applicant: HUAZHONG UNIVERSITY OF SCIENCE AND TECHNOLOGY, Hubei (CN)

(72) Inventors: Dong Jiang, Hubei (CN); Yixuan Shuai, Hubei (CN); Feng Hu, Hubei (CN); Zicheng Liu, Hubei (CN); Mingqu Zhou, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 225 days.

(21) Appl. No.: 18/834,632

(22) PCT Filed: Oct. 8, 2023

(86) PCT No.: PCT/CN2023/123311
§ 371 (c)(1),
(2) Date: Jul. 31, 2024

(87) PCT Pub. No.: WO2024/216869
PCT Pub. Date: Oct. 24, 2024

(65) Prior Publication Data
US 2026/0180485 A1 Jun. 25, 2026

(30) Foreign Application Priority Data
Apr. 21, 2023 (CN) ......................... 202310459821.0

(51) Int. Cl.
*H02P 29/024* (2016.01)
*H02P 29/028* (2016.01)

(52) U.S. Cl.
CPC ........ *H02P 29/028* (2013.01); *H02P 29/0243* (2016.02); *H02P 29/027* (2013.01); *H02P 2209/11* (2013.01)

(58) Field of Classification Search
CPC .. H02P 29/028; H02P 29/0243; H02P 29/027; H02P 2209/11
(Continued)

(56) References Cited

U.S. PATENT DOCUMENTS 5,578,880 A * 11/1996 Lyons ................ F16C 32/0455 310/90.5
6,064,172 A * 5/2000 Kuznetsov ........... G01R 31/346 318/434
(Continued)

FOREIGN PATENT DOCUMENTS

| | | |
|---|---|---|
| CN | 101026348 | 8/2007 |
| CN | 107769665 | 3/2018 |
| CN | 109039132 | 12/2018 |
| CN | 115085523 | 9/2022 |
| CN | 116498651 | 7/2023 |
| KR | 20090012544 | 2/2009 |

OTHER PUBLICATIONS

"International Search Report (Form PCT/ISA/210) of PCT/CN2023/123311", mailed on Jan. 13, 2024, pp. 1-3.

*Primary Examiner* — Gabriel Agared
(74) *Attorney, Agent, or Firm* — JCIPRNET

(57) ABSTRACT

The invention discloses a switch short-circuit fault-tolerant control method and a system for magnetic bearing system, which belongs to the field of magnetic bearing control. N-axis magnetic bearing contains 2N H half-bridge topologies, 2N windings, and 1 DC voltage source. The current and modulation wave of each winding are monitored in real time. When a switch short-circuit fault occurs, the above data help to identify the faulty switches. By introducing the physical model of the electromagnetic force of the magnetic bearing, winding currents can be redistributed and the required electromagnetic force can be reconstructed to
(Continued)

ensure rotor suspension and avoid serious faults such as rotor falling. This method can effectively prevent the magnetic bearing system from being destabilized when the switch short-circuit fault occurs, prevent the rotor from falling, and enable the magnetic bearing system to have the ability to operate with switch short-circuit fault tolerance.

12 Claims, 6 Drawing Sheets

(58) Field of Classification Search
USPC .......................................................... 318/434
See application file for complete search history.

(56) References Cited

U.S. PATENT DOCUMENTS 6,297,574 B1 * 10/2001 Schob ................. F16C 32/0457
310/68 B
2005/0264254 A1 * 12/2005 Lequesne ............. H02H 7/0833
318/701
2010/0181855 A1 * 7/2010 Denk .................. F16C 32/0457
310/90.5
2011/0012456 A1 * 1/2011 Barada ................ F16C 32/0457
310/90.5
2016/0141988 A1 * 5/2016 Krolak .................... H02P 9/107
322/68
2017/0307012 A1 * 10/2017 Jiang ................... F16C 32/0442

* cited by examiner

SWITCH SHORT-CIRCUIT FAULT-TOLERANT CONTROL METHOD AND SYSTEM FOR MAGNETIC LEVITATION BEARING

CROSS-REFERENCE TO RELATED APPLICATION

This application is a 371 of international application of PCT application serial no. PCT/CN2023/123311, filed on Oct. 8, 2023, which further claims the priority benefit of China application no. 202310459821.0, filed on Apr. 21, 2023. The entirety of each of the above-mentioned patent applications is hereby incorporated by reference herein and made a part of this specification.

TECHNICAL FIELD

The invention belongs to the field of magnetic levitation bearing control, and more specifically, relates to a switch short-circuit fault-tolerant control method and a system for a magnetic levitation bearing.

RELATED ART

A magnetic levitation bearing is a typical electromechanical integration system, which is a bearing device that passes a current through a magnetic pole to generate an electromagnetic force to levitate a rotor stably, whose purpose is to replace the traditional mechanical bearing and achieve contact-free operation between the rotor and the magnetic pole, has characteristics of no need for lubrication, no friction, and long working life, and is very popular in some high-speed applications. The magnetic levitation bearing is widely used and suitable for environments of high speed such as flywheel energy storage, compressors, and blowers, or environments require clean spaces. In an active magnetic levitation bearing system, components such as rotors, sensors, controllers, and electromagnetic actuators are mainly included. As the core of electromechanical conversion, the power amplifier in the active magnetic levitation bearing system plays a decisive role in the entire system.

In power amplifiers, the most common circuit topology is the H half-bridge control topology, which has a large number of components and many potential fault points. In an environment with high load, high dynamics, and strong interference, short-circuit faults can easily occur. In the power amplifier of the magnetic levitation bearing, if the short-circuit fault occurs in the switching device, then the voltage control at the midpoint of the leg fails, which causes the winding current to deviate from a command value, so that the position of the rotor becomes unstable. In severe cases, severe consequences such as severe overcurrent of the device and back-and-forth collisions between the high-speed rotor and the protective bearings are caused.

SUMMARY OF INVENTION

In view of the above defects or improvement needs of the existing technology, the present invention provides a switch short-circuit fault-tolerant control method and a system for a magnetic levitation bearing, the purpose is to provide a fault-tolerant control method for a magnetic levitation bearing controller facing a switch short-circuit fault, so as to solve the problem that the existing controller does not have the fault-tolerant operation capability when a switch short-circuit fault occurs.

In order to achieve the above purpose, the present invention provides a switch short-circuit fault-tolerant control method for a magnetic levitation bearing. The magnetic levitation bearing includes: 2N H half-bridge driver topologies, 2N windings, and 1 DC voltage source;

Each H half-bridge driver topology includes two legs, which jointly realize driving and controlling of one winding, and two windings jointly realize control of one shaft. Two ends of the winding are respectively connected to a leg; the upper end of one leg is a switching device and the lower end is a unipolar conduction device; the upper end of the other leg is a unipolar conduction device and the lower end is a switch device. The upper end of the leg is connected to the positive end of the DC voltage source, and the lower end of the leg is connected to the negative end of the DC voltage source.

The switch short-circuit fault-tolerant control method of the magnetic bearing includes steps as follows:

(1) When the magnetic bearing is in normal operation, the current on each winding is monitored in real time, fault determination is performed based on the monitored currents, and the fault is located to a winding controlling a certain shaft where the fault occurs;

(2) When the magnetic bearing is in normal operation, the modulated wave output by the current loop controller on each winding of the faulty shaft is monitored in real time, fault determination is performed based on the monitored modulated waves, and the fault is located to a certain H half-bridge;

(3) After the short-circuit fault is determined, a switching transistor modulation strategy of the H half-bridge topology is changed. In addition, the winding current controlled by the faulty topology is fixed to a constant value. According to the electromagnetic force model of the magnetic bearing, the current control command of the other winding corresponding to the shaft is determined to realize the electromagnetic force reconstruction of the magnetic bearing and ensure that a rotor of the magnetic bearing can still levitate normally.

Further preferably, in the method for performing fault determination based on the monitored winding current, a threshold value is set for the sum of the two winding currents of each shaft, and the threshold value should be greater than the sum of the two winding currents under a normal operating condition. When the magnetic bearing is in operation, the sum of the two winding currents corresponding to each shaft is monitored in real time and compared with the threshold value. When a short-circuit fault of the switching device occurs, the sum of the two winding currents corresponding to the shaft is increased rapidly and greater than the set threshold value.

Further preferably, in the method for performing fault determination based on the monitoring modulated wave output by the current loop controller of each winding, a threshold value of the modulated wave output by the current loop controller of the winding is set. When the magnetic bearing is in operation, the modulated wave value output by the current loop of each winding is monitored in real time and compared with the threshold value. When a short-circuit fault of the switching device occurs, the modulated wave value output by the current loop of the corresponding winding is decreased rapidly and significantly lower than the threshold value set.

Further preferably, in the operation of changing the modulation strategy of the H half-bridge where the short-circuit fault occurs, after the short-circuit fault occurs, a corresponding relationship of the modulated waves output by the current loop of the winding generating modulated waves of the two legs of the H half-bridge needs to be changed. In a normal mode, if the modulated wave output by the current loop of the winding is u, the modulated wave of the leg of the H half-bridge topology is set to 0.5+0.5u when the upper tube is the switching transistor, and the modulated wave of the leg of the H half-bridge topology is set to 0.5-0.5u when the lower tube is the switching transistor. In the event of a short-circuit fault, both the modulated waves of the two legs of the H half-bridge topology are set to 1−u.

Further preferably, according to the electromagnetic force model of the magnetic bearing, fix the winding current controlled by the faulty topology to the constant value, and determine the control command corresponding to the other winding current controlled by the normal H half-bridge, according to the principle that two windings of one shaft of the magnetic bearing generate the electromagnetic force. Under normal circumstances, two winding currents in one axis are $i_{aref}$ and $i_{cref}$. In the normal condition, the sum of the two currents is twice the system preset bias current, that is, $i_{aref}+i_{cref}=2I_{bias}$. The corresponding electromagnetic force thereof is $$F_{mag}=k_{mag}\left(\frac{i_{aref}^2}{s_1^2}-\frac{i_{cref}^2}{s_2^2}\right).$$

In the formula, $s_1$ and $s_2$ are respectively distances from the rotor to the two magnetic poles, and $k_{mag}$ is a constant related to the electromagnetic force. After the short-circuit fault occurs in one H half-bridge topology, the ability thereof to drive the winding for dynamic response is significantly reduced. Therefore, the winding is generally controlled to the constant preset bias current $I_{bias}$ (may also be controlled to other values), and the magnitude of the current flowing through the opposite winding $i_{new}$ is calculated according to the original electromagnetic force formula. If the short-circuit fault occurs in the H half-bridge topology controlling the first winding, then $i_{new}$ needs to satisfy $$F_{mag}=k_{mag}\left(\frac{i_{aref}^2}{s_1^2}-\frac{i_{cref}^2}{s_2^2}\right)=k_{mag}\left(\frac{I_{bias}^2}{s_1^2}-\frac{i_{new}^2}{s_2^2}\right);$$

if the short-circuit fault occurs in the H half-bridge topology controlling the second winding, then $i_{new}$ needs to satisfy $$F_{mag}=k_{mag}\left(\frac{i_{aref}^2}{s_1^2}-\frac{i_{cref}^2}{s_2^2}\right)=k_{mag}\left(\frac{i_{new}^2}{s_1^2}-\frac{I_{bias}^2}{s_2^2}\right).$$

Further preferably, in the electromagnetic force model, the distances $s_1$ and $s_2$ between the rotor and the two magnetic poles are obtained by linear calculations from corresponding displacement sensors.

Further preferably, the switching device is a fully controlled switching device, including an insulated gate bipolar transistor; and the unidirectional conduction device is a diode.

The invention further provides a switch short-circuit fault-tolerant control system for a magnetic bearing, including: a computer-readable storage medium and a processor;

The computer-readable storage medium is used to store executable commands;

The processor is configured to read the executable commands stored in the computer-readable storage medium and execute the switch short-circuit fault-tolerant control method for the magnetic bearing.

DESCRIPTION OF EMBODIMENTS

In order to make the purpose, technical solutions, and advantages of the present invention more clear, the present invention will be further described in detail below with reference to the accompanying drawings and embodiments. It should be understood that the specific embodiments described here are only used to explain the present invention and the embodiments are not intended to limit the present invention. In addition, the technical features involved in the various embodiments of the present invention described below may be combined with each other as long as the features do not conflict with each other.

In order to achieve the above purpose, the present invention provides a switch short-circuit fault-tolerant control method for a magnetic bearing. The magnetic bearing includes: 2N H half-bridge driver topologies, 2N windings, and 1 DC voltage source.

Figure 1:
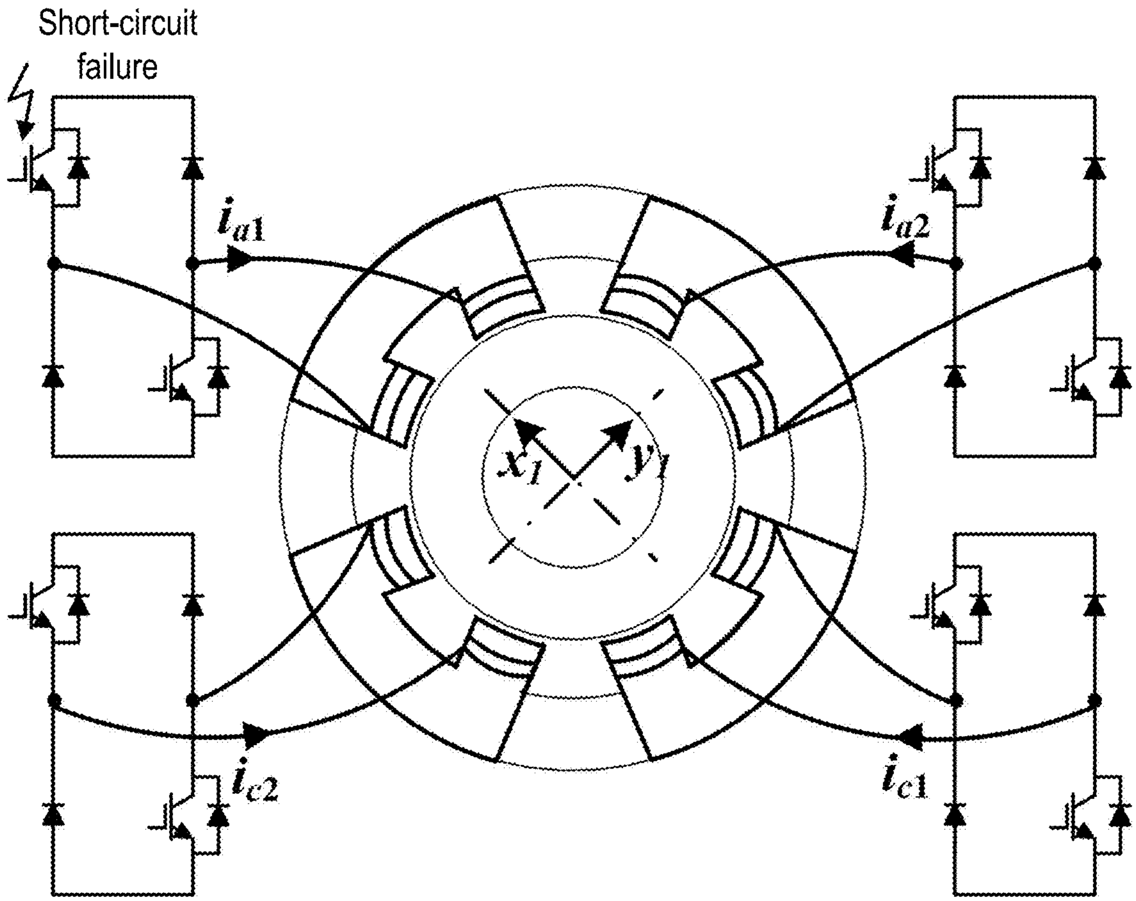
FIG. 1 is a schematic diagram of a switch short-circuit fault occurs in an eight-pole radial magnetic bearing structure and a controller thereof provided by the present invention.

FIG. 1 contains the structure of a single radial eight-pole magnetic bearing and a relationship thereof with a controller. Each H half-bridge driver topology includes two legs, which jointly realize drive and control of one winding, and two windings jointly realize control of one shaft. Two ends of the winding are respectively connected to a leg; of the two legs connected to the winding, the upper end of one leg is a switching device and the lower end is a unipolar conduction device, and the upper end of the other leg is a unipolar conduction device and the lower end is a switching device. The upper end of the leg is connected to the positive end of the DC voltage source, and the lower end of the leg is connected to the negative end of the DC voltage source.

Specifically, the switching device is a fully controlled switching device, including an insulated gate bipolar transistor; and the unidirectional conduction device is a diode.

FIG. 1 is a schematic diagram of a short-circuit fault occurs in a switching transistor in the controller. In order to achieve fault-tolerant control when the fault happens, the switch short-circuit fault-tolerant control method of the magnetic bearing includes steps as follows:

(1) When the magnetic bearing is in normal operation, the current on each winding is monitored in real time, fault determination is performed based on the monitored currents, and the fault is located to a winding controlling a certain shaft where the fault occurs;

(2) When the magnetic bearing is in normal operation, the modulated wave output by the current loop controller on each winding of the faulty shaft is monitored in real time, fault determination is performed based on the monitored modulated waves, and the fault is located to a certain H half-bridge;

(3) After the short-circuit fault is determined, a switching transistor modulation strategy of the H half-bridge topology is changed. In addition, the winding current controlled by the faulty topology is fixed to a constant value. According to an electromagnetic force model of the magnetic bearing, the current control command of the other winding corresponding to the shaft is determined to realize the electromagnetic force reconstruction of the magnetic bearing and ensure that a rotor of the magnetic bearing can still levitate normally.

Figure 2:
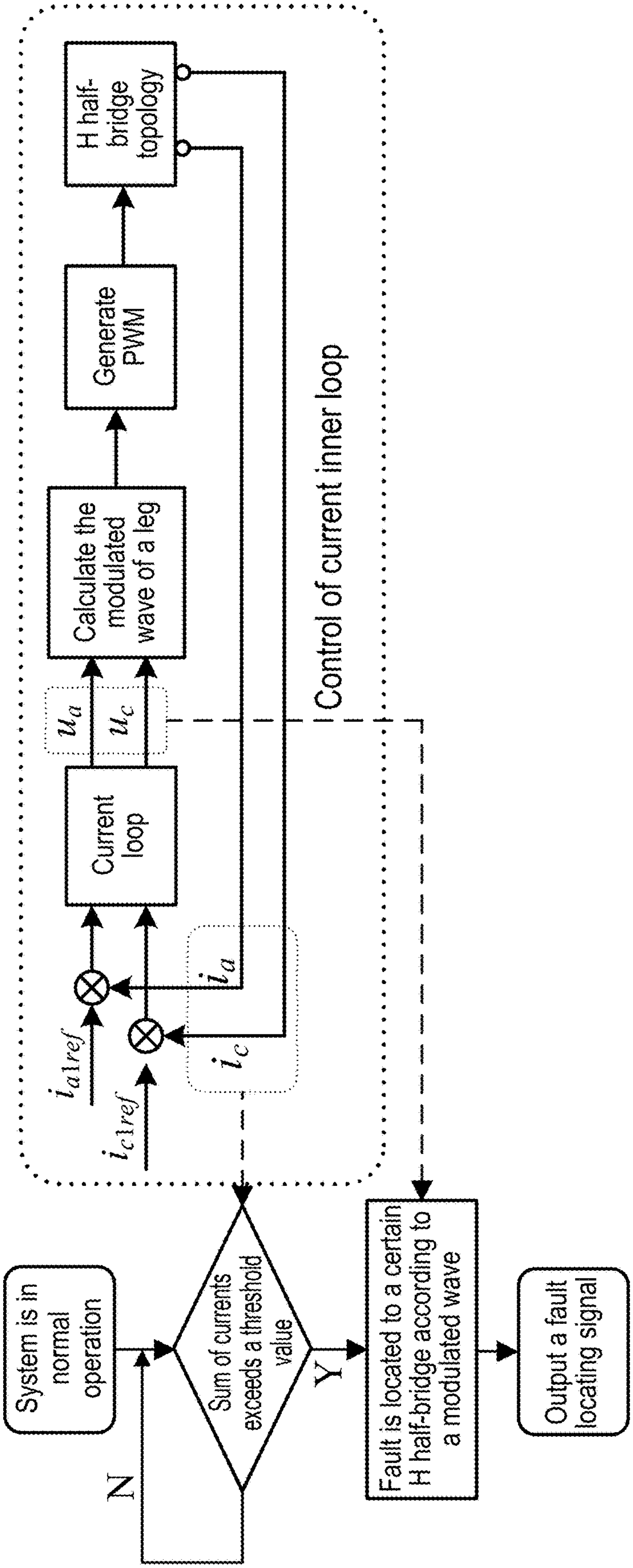
FIG. 2 is a flow chart of controller short circuit fault detection provided by the present invention.

FIG. 2 is a flow chart of controller short circuit fault detection provided by the present invention. The overall process thereof is to monitor in real time the current of each winding and the modulated wave output by the current loop, and determination of whether a short-circuit fault occurs is performed by using the above data. In the first step, a preliminary determination is realized according to the sum of two winding currents of each shaft. This solution can accurately determine whether the short circuit has occurred and can accurately identify the faulty shaft. In the second step, according to the modulated wave output by the two winding current loops, specifically, the solution can accurately identify the faulty H half-bridge. According to the above two steps, fault determination and accurate location are realized.

Specifically, in the method for performing fault determination based on the monitored winding current, a threshold value is set for the sum of the two winding currents of each shaft, and the threshold value should be greater than the sum of the two winding currents under a normal operating condition. When the magnetic bearing is in operation, the sum of the two winding currents corresponding to each shaft is monitored in real time and compared with the threshold value. When a short-circuit fault of the switching device occurs, the sum of the two winding currents corresponding to the shaft is increased rapidly and greater than the set threshold value.

Specifically, in the method for performing fault determination based on the monitoring modulated wave output by the current loop controller of each winding, a threshold value of the modulated wave output by the current loop controller of the winding is set. When the magnetic bearing is in operation, the modulated wave value output by the current loop of each winding is monitored in real time and compared with the threshold value. When a short-circuit fault of the switching device occurs, the modulated wave value output by the current loop of the corresponding winding is decreased rapidly and significantly lower than the threshold value set.

Figure 3:
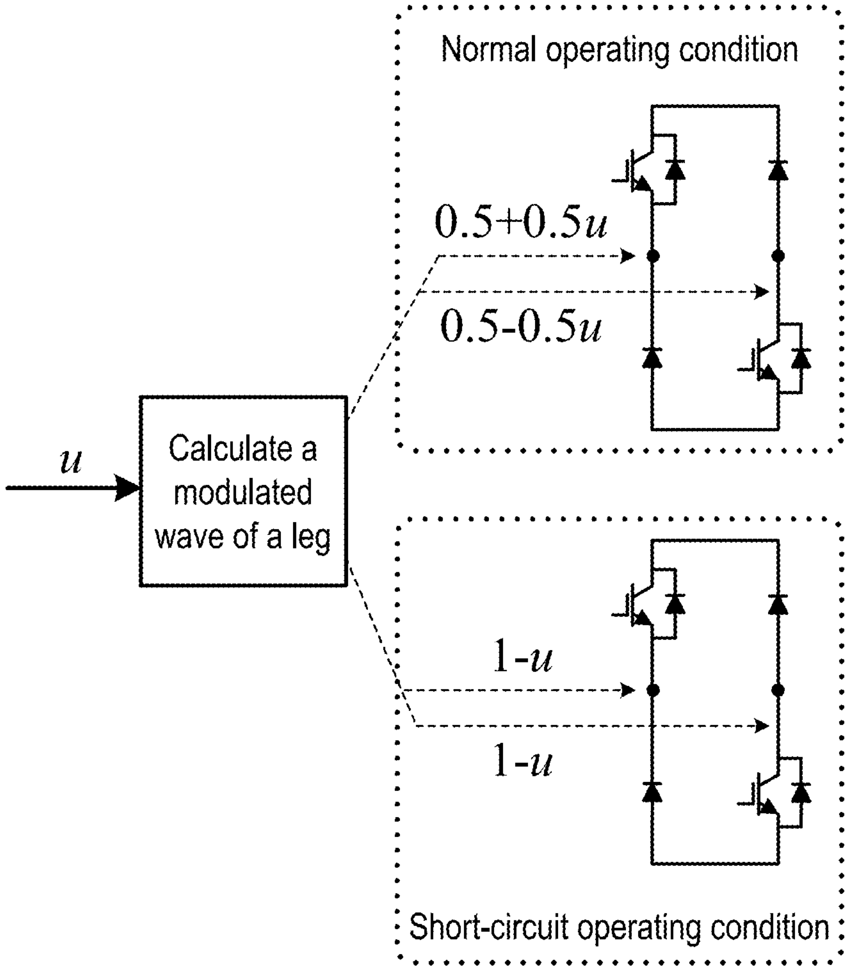
FIG. 3 is a schematic diagram of modulated wave generation of leg before and after a short-circuit fault occurs in an H half-bridge provided by the present invention.

FIG. 3 is a schematic diagram of modulated wave generation of leg before and after a short-circuit fault occurs in an H half-bridge provided by the present invention. In a normal mode, if the modulated wave output by the current loop of the winding is u, the modulated wave of the leg of the H half-bridge topology is set to 0.5+0.5u when the upper tube is a switching transistor, and the modulated wave of the leg of the H half-bridge topology is set to 0.5-0.5u when the lower tube is a switching transistor. In the event of short-circuit fault, both the modulated waves of the two legs of the H half-bridge topology are set to 1−u.

Figure 4:
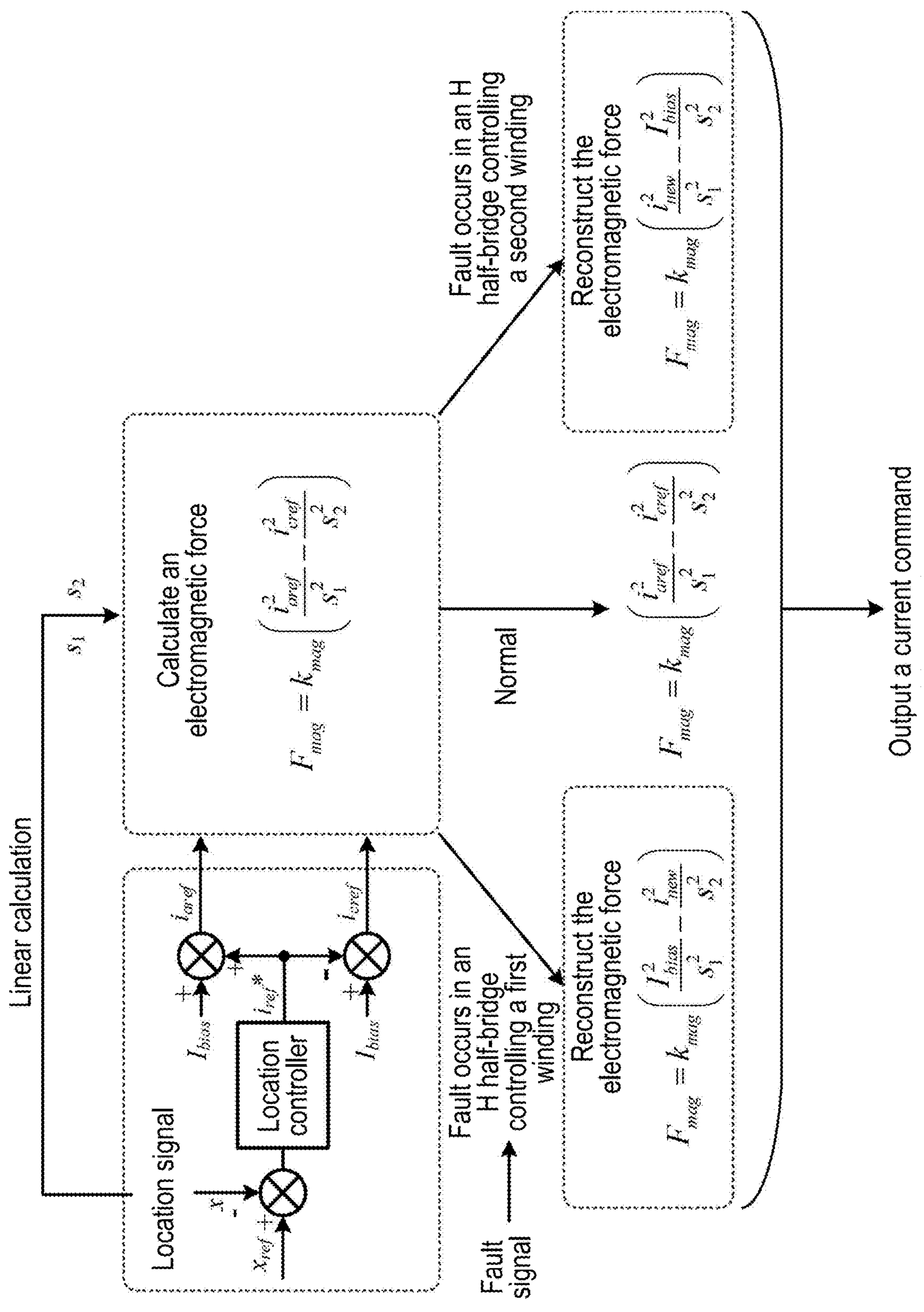
FIG. 4 is a schematic diagram of displacement-current control of the H half-bridge in a normal mode and a fault-tolerant mode after the short-circuit fault provided by the present invention.

FIG. 4 is a schematic diagram of displacement-current control of the H half-bridge in a normal mode and a fault-tolerant mode after the short-circuit fault provided by the present invention.

Specifically, in the operation of according to the electromagnetic force model of the magnetic bearing, fixing the winding current controlled by the faulty topology to the constant value, and determining the control command corresponding to the other winding current controlled by the normal H half-bridge, according to the principle that two windings of one shaft of the magnetic bearing generate the electromagnetic force, under normal circumstances, first and second winding currents of the shaft are $i_{aref}$ and $i_{cref}$. Under the normal operating condition, the sum of the two currents is twice the system preset bias current, that is, $i_{aref}+i_{cref}=2I_{bias}$. The corresponding electromagnetic force thereof is $$F_{mag} = k_{mag}\left(\frac{i_{aref}^2}{s_1^2} - \frac{i_{cref}^2}{s_2^2}\right).$$

In the formula, $s_1$ and $s_2$ are respectively distances from the rotor to the two magnetic poles, and $k_{mag}$ is a constant related to the electromagnetic force. After the short-circuit fault occurs in the H half-bridge topology, the ability thereof to drive the winding for dynamic response is significantly reduced. Therefore, the winding is generally controlled to a constant bias current $I_{bias}$ (may also be controlled to other values), and the magnitude of the current flowing through the corresponding winding $i_{new}$ is calculated according to the original electromagnetic force formula. If the short-circuit fault occurs in the H half-bridge topology controlling the first winding, then $i_{new}$ needs to satisfy $$F_{mag} = k_{mag}\left(\frac{i_{aref}^2}{s_1^2} - \frac{i_{cref}^2}{s_2^2}\right) = k_{mag}\left(\frac{I_{bias}^2}{s_1^2} - \frac{i_{new}^2}{s_2^2}\right);$$

if the short-circuit fault occurs in the H half-bridge topology controlling the second winding, then $i_{new}$ needs to satisfy $$F_{mag} = k_{mag}\left(\frac{i_{aref}^2}{s_1^2} - \frac{i_{cref}^2}{s_2^2}\right) = k_{mag}\left(\frac{i_{new}^2}{s_1^2} - \frac{I_{bias}^2}{s_2^2}\right).$$

Figure 5:
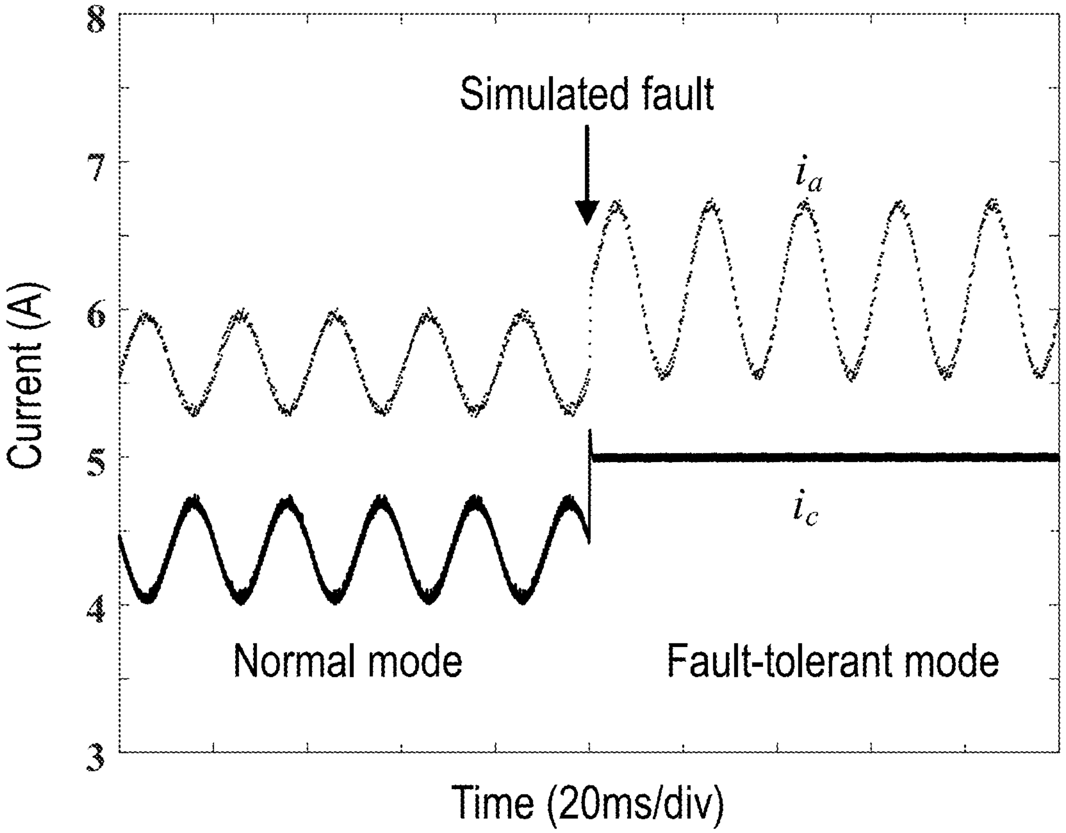
FIG. 5 is a schematic diagram of currents of two windings before and after the short-circuit fault occurs in the H half-bridge provided by the present invention.
Figure 6:
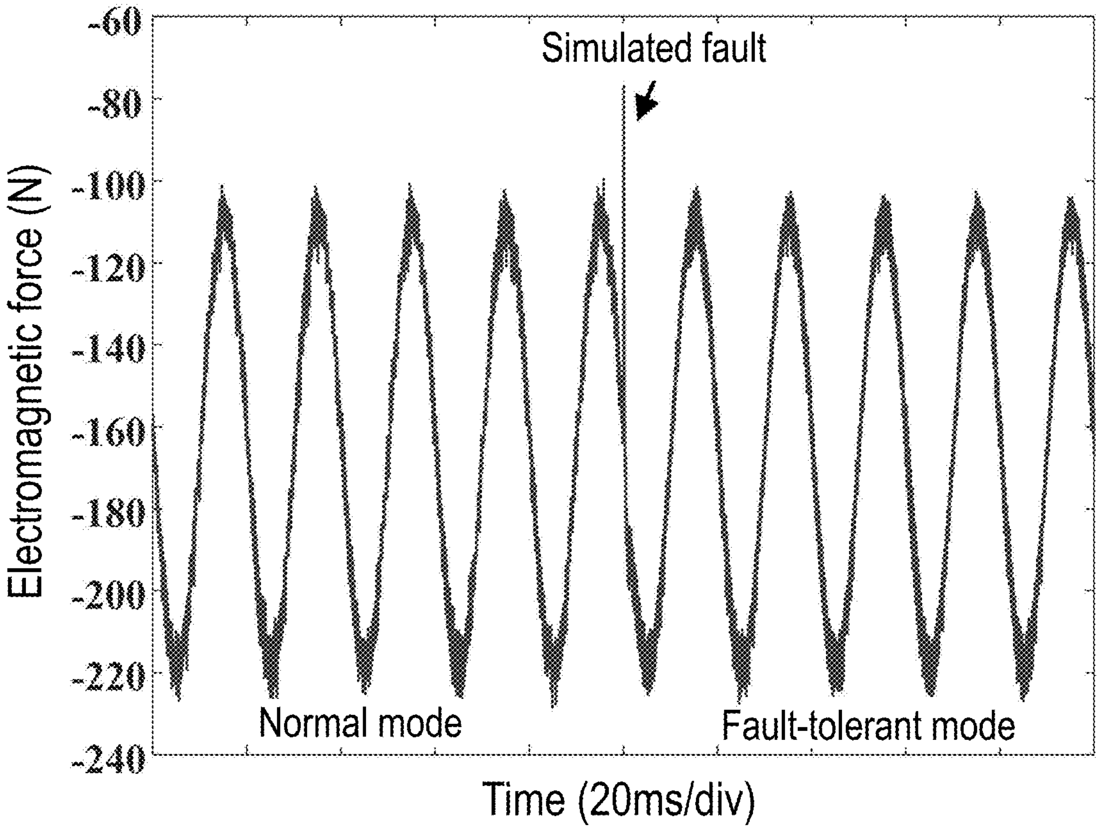
FIG. 6 is a schematic diagram of an electromagnetic force generated by the two windings before and after the short-circuit fault occurs in the H half-bridge provided by the present invention.

FIG. 5 and FIG. 6 are respectively the current and output electromagnetic force waveforms of the two windings of the shaft under simulated short-circuit faults. From FIG. 5, the originally set bias current is 5A. If short circuit occurs in a switching transistor controlling $i_a$, the current thereof rises rapidly. After the short-circuit fault is detected, $i_a$ is controlled to a constant value. Taking 5A as an example, the system can still operate normally in the fault-tolerant mode. In FIG. 6, the electromagnetic forces output in the normal mode and the fault-tolerant mode are basically the same.

Specifically, in the electromagnetic force model, the distances $s_1$ and $s_2$ between the rotor and the two magnetic poles are obtained by linear calculations from corresponding displacement sensors.

Generally speaking, compared with the existing technology through the above technical solutions conceived by the present invention, the present invention provides the switch short-circuit fault-tolerant control method and the system for the magnetic bearing, which can monitor in real time the operation of the controller to determine whether the short-circuit fault occurs. In the event of short-circuit fault, the strategy of changing the modulated wave and the idea of electromagnetic force reconstruction are used to achieve steady suspension of the rotor, which ensures that the rotor does not collide with the protective bearing. For the magnetic bearing system, when the short-circuit fault of the switching device occurs, the system can be guaranteed to operate without shutdown in the fault-tolerant mode, which effectively improves the fault response capability of the magnetic bearing system.

By introducing the physical model of the electromagnetic force of the magnetic bearing, the corresponding winding current can be redistributed and the required electromagnetic force can be reconstructed to ensure the normal suspension of the rotor and avoid serious faults such as system shutdown caused by the rotor falling. This method can effectively prevent the magnetic bearing system from being destabilized when the switch short-circuit fault occurs, prevent the rotor from falling, enable the magnetic bearing system to have the ability to operate with switch short-circuit fault tolerance, and effectively improve system reliability.

It is easy for persons skilled in the art to understand that the above descriptions are only preferred embodiments of the present invention and the embodiments are not intended to limit the present invention. Any modifications, equivalent substitutions, and improvements, and the like, made within the spirit and principles of the present invention, all should be included in the protection scope of the present invention.

What is claimed is:

1. A switch short-circuit fault-tolerant control method for a magnetic bearing, wherein the magnetic bearing is an N-axis magnetic bearing comprises 2N H half-bridge driver topologies, 2N windings, and one direct current (DC) voltage source; each of the H half-bridge driver topologies is configured to drive and control a corresponding winding, and two windings distributed along an axis jointly realize control in one direction; each of the H half-bridge driver topologies comprises two legs respectively connected to two ends of the corresponding winding, an upper end of one of the legs is a switching device and a lower end is a unipolar conduction device, an upper end of the other leg is a unipolar conduction device and a lower end is a switching device, the upper ends of all of the legs are connected to a positive end of the DC voltage source, and the lower ends of the legs are connected to a negative end of the DC voltage source; the control method is characterized by comprising steps as follows:

(1) when the magnetic bearing is in operation, monitoring a current on each of the windings in real time, performing fault determination based on the currents monitored, and locating a fault to a winding controlled by a switch where the fault occurs;

(2) monitoring a modulated wave output by a current loop controller on each of the windings of the faulty axis in real time, performing fault determination based on the modulated waves monitored, and locating the fault to a certain H half-bridge; and (3) after the short-circuit fault is determined, changing a modulation strategy of a switch in the H half-bridge topology, in addition, fixing the winding current controlled by the faulty H half-bridge topology to a constant value, and according to an electromagnetic force model of the magnetic bearing, determining a current control command of the other winding in the direction to realize electromagnetic force reconstruction of the magnetic bearing and ensure rotor suspension.

2. The fault-tolerant control method according to claim 1, wherein performing fault determination based on the winding currents monitored comprises:

setting a threshold value of a sum of the two winding currents of each of the direction, wherein the threshold value is greater than the sum of the two winding currents under a normal condition; when the magnetic bearing is in operation, monitoring in real time the sum of the two winding currents of each direction and comparing with the threshold value, wherein when the short-circuit fault of the switching device occurs, the sum of the two winding currents in the axis is increased rapidly and greater than the threshold value set.

3. The fault-tolerant control method according to claim 2, wherein performing fault determination based on the modulated waves monitored comprises:

setting a threshold value of the modulated wave output by the current loop controller of the winding; when the magnetic bearing is in operation, monitoring a modulated wave value output by the current loop of each of the windings in real time and comparing with the threshold value, wherein when the short-circuit fault of the switching device occurs, the modulated wave value output by the current loop of the corresponding winding is decreased rapidly and significantly lower than the threshold value set.

4. The fault-tolerant control method according to claim 3, characterized in that, changing the switching transistor modulation strategy of the H half-bridge topology comprises:

after the short-circuit fault occurs, a corresponding relationship of the modulated waves output by the current loop of the winding generating modulated waves of the two legs of the H half-bridge being changed; in a normal mode, if the modulated wave output by the current loop of the winding is u, setting the modulated wave of the leg of the H half-bridge topology to 0.5+0.5u when an upper end is the switching transistor, setting the modulated wave of the leg of the H half-bridge topology to 0.5−0.5u when a lower end is the switching transistor; in an event of short-circuit fault, setting both the modulated waves of the two legs of the H half-bridge topology to 1−u.

5. The fault-tolerant control method according to claim 3, wherein fixing the winding current controlled by the faulty H half-bridge topology to the constant value, and according to the electromagnetic force model of the magnetic bearing, determining the current control command of the other winding in the direction comprises:

fixing the winding current controlled by the faulty H half-bridge topology to a constant value $I_0$, and according to a formula for generating an electromagnetic force from currents of two windings in one axis, calculating a magnitude $i_{new}$ of a current for the opposite winding;

if the short-circuit fault occurs in the H half-bridge topology controlling a first winding, then $i_{new}$ satisfies $$\frac{i_{aref}^2}{s_1^2} - \frac{i_{cref}^2}{s_2^2} = \frac{I_0^2}{s_1^2} - \frac{i_{new}^2}{s_2^2};$$

if the short-circuit fault occurs in the H half-bridge topology controlling a second winding, then $i_{new}$ satisfies $$\frac{i_{aref}^2}{s_1^2} - \frac{i_{cref}^2}{s_2^2} = \frac{i_{new}^2}{s_1^2} - \frac{I_0^2}{s_2^2};$$

wherein $i_{aref}$ and $i_{cref}$ are the currents of the two windings at this operating point in the normal mode.

6. The fault-tolerant control method according to claim 5, comprising: distances $s_1$ and $s_2$ between the rotor and the two magnetic poles are obtained by linear calculations from corresponding displacement sensors.

7. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 1.

8. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 2.

9. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 3.

10. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 4.

11. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 5.

12. A switch short-circuit fault-tolerant control system for a magnetic bearing, comprising: a non-transitory computer-readable storage medium and a processor; wherein the computer-readable storage medium is configured to store executable commands;

the processor is configured to read the executable commands stored in the computer-readable storage medium and execute the switch short-circuit fault-tolerant control method for the magnetic bearing according to claim 6.

* * * * *